United States Patent [19]

Hufnagel et al.

[11] 4,374,864

[45] Feb. 22, 1983

[54] SOLUBLE COFFEE PROCESS

[75] Inventors: Willi Hufnagel, Ludwigsburg, Fed. Rep. of Germany; Maurice Blanc, Morges; Walter Balimann, Orbe, both of Switzerland

[73] Assignee: Societe D'Assistance Technique pour Produits Nestle S.A., Lausanne, Switzerland

[21] Appl. No.: 252,200

[22] Filed: Apr. 8, 1981

[51] Int. Cl.³ .............................. A23F 5/26; A23F 5/44
[52] U.S. Cl. ..................................... 426/594; 426/596; 426/431; 426/432; 426/434
[58] Field of Search ............... 426/594, 596, 431, 432, 426/434

[56] References Cited

U.S. PATENT DOCUMENTS 3,007,797 11/1961 Tiktak .............................. 426/596 X

FOREIGN PATENT DOCUMENTS 951565 7/1974 Canada ................................ 426/432

6646 1/1980 European Pat. Off. .................. 596/

*Primary Examiner*—Joseph M. Golian
*Attorney, Agent, or Firm*—Vogt & O'Donnell

[57] ABSTRACT

A process for forming a vegetable extract in a system comprising a series of cells containing coffee and coffee substitute, by contacting progressively fresher vegetable materials countercurrently with an extraction liquid which enters an inlet cell and is withdrawn in batches from an outlet cell characterized in that the outlet cell and each succeeding alternate cell contains more coffee than any one of their respective adjacent cells and during or after each draw-off the pair of cells containing the most exhausted vegetable material is disconnected from the system for discharge and reloading, and after each draw-off a pair of cells with fresh loads of coffee and coffee substitute is added to the system so that the outlet cell is the second in series and contains the majority of coffee of the pair, the amount of soluble solids in each draw-off being approximately twice the amount drawn off in a standard process.

8 Claims, No Drawings

SOLUBLE COFFEE PROCESS

The present invention relates to a process for making a vegetable extract, more particularly a soluble coffee prepared from a mixture of coffee and coffee substitutes.

The standard process for the preparation of soluble coffee involves water extraction of roast and ground coffee beans and subsequent drying of the extract. On an industrial scale the coffee extract is usually produced by passing hot water through an extraction system comprising a plurality of cells containing roasted and ground coffee in a countercurrent manner. That is to say, the hot water enters the extraction system at a cell containing the most exhausted batch of coffee, passes through progressively fresher coffee grounds contained in successive cells and is finally drawn off from the cell containing the freshest batch of coffee. After the extract has passed through all the cells and drawn off from the cell containing the freshest coffee, the cell containing the most exhausted coffee is disconnected from the system, emptied, filled with fresh coffee and then reconnected to the system as the cell now containing the freshest batch of coffee, while the water supply is connected to the cell which now contains the most exhausted batch of coffee. The process is repeated and in this way the cells are rotated in order from the fresh stage back to the most exhausted stage and the water flows from the most exhausted stage through the system to the freshest stage. However the quality of the coffee in the extract tends to vary with the best quality being obtained at the start of the draw-off and the poorest quality being obtained at the end of the draw off.

It has been proposed to enhance the flavour of the soluble coffee finally produced by stripping volatile aromatics from the roasted and ground coffee before extraction and then adding them back after extraction.

However, it has been found that some coffees are degraded when subjected to stripping and therefore much of the improvement achieved by addback of the volatiles is lost because the solids that are drawn off are degraded as compared to solids drawn off from a system in which the coffee has not been subjected to stripping.

Canadian Pat. No. 951 565 describes a method of achieving a significant improvement in the flavour of soluble coffee, in which the roasted and ground coffee is subjected to stripping before extraction, by operating the cells of the extraction system in pairs wherein the volatiles are stripped out of every other cell and the extract is drawn off from the cells that have not been subjected to stripping. In this process the coffee extract is drawn off from the second in series of a pair of cells containing the freshest coffee, and at the end of each draw-off two cells containing fresh coffee are introduced, the cell which is not to be used as a draw-off stage being subjected to a stripping operation, while the two cells containing the most exhausted coffee are disconnected, emptied and reloaded with fresh coffee ready to be introduced to the system as the pair of cells containing the freshest coffee after the next draw-off. In this process a double draw-off technique is used, that is the amount of extract drawn off per batch is twice the amount drawn off by a standard process using a single draw-off. However, the above mentioned patent relates to the extraction of a system containing only coffee. Soluble coffee as prepared commercially is often extracted from a system containing in addition to coffee, other vegetable materials known as coffee substitutes. Examples of coffee substitutes are barley, malt and chicory. One of the problems in preparing a soluble coffee from such mixtures is getting rid of the flavour of the substitute. We have found, surprisingly, that by operating the cells of the extraction system in pairs and using a double draw-off technique for a mixture of coffee and coffee substitutes we can obtain an improvement of the coffee flavour and a reduction of the substitute flavour without the need for a stripping process before extraction.

Accordingly, the present invention provides a process for forming a vegetable extract in a system comprising a series of cells containing coffee and coffee substitute, by contacting progressively fresher vegetable materials countercurrently with an extraction liquid which enters an inlet cell and is withdrawn in batches from an outlet cell characterised in that the outlet cell and each succeeding alternate cell contains more coffee than a respective adjacent cell and during or after each draw-off the pair of cells containing the most exhausted vegetable material is disconnected from the system for discharge and reloading, and after each draw-off a pair of cells with fresh loads of coffee and coffee substitute is added to the system so that the outlet cell is the second in series and contains the majority of coffee of the pair, the amount of soluble solids in each draw-off being approximately twice the amount drawn off in a standard process.

The number of cells employed is generally from 4 to 8. We have found that it is advantageous to use an odd number of cells in the extraction system in which both the inlet and outlet cells contain more coffee than their respective adjacent cells. The use of five cells is particularly advantageous. The temperature is usually in the range of from about 140° to 190° C. in the inlet cell and from about 80° to 100° C. in the outlet cell. The decrease in temperature from the inlet cell to the outlet cell is known as the temperature profile.

The proportions of coffee and coffee substitute which form the vegetable material may vary widely. For example, the vegetable material may contain from 40 to 80% coffee but the process of this invention is especially applicable to mixtures which contain from 45 to 75% coffee. The usual coffee substitutes such a chicory, malt and barley may be employed in the present invention.

When the proportion of coffee in the vegetable material is from 45 to 60%, the cell, of an adjacent pair of cells, which contains the majority of coffee advantageously contains from 80 to 95% of the total coffee of the pair: and where the proportion of coffee in the vegetable material is from 60 to 70%, the cell, of an adjacent pair of cells, which contains the majority of coffee advantageously contains from 70 to 80% of the total coffee of the pair.

Where the proportion of coffee in the vegetable material is above 40% the alternate cells containing the majority of coffee preferably contain no or substantially no coffee substitute at all.

Chicory contains certain heat sensitive substances such as inulin and fructosans which tend to break down at high temperatures. In a normal extraction process where both chicory and coffee are present in each cell, the chicory is subjected to the same extraction temperatures as the coffee. The highest temperature is at the inlet cell and here the inulin and fructosans can be hydrolysed to substances which are derogatory to the process and to the coffee. In the present invention where all or substantially all the coffee substitute is present in the second, fourth and, if present the sixth cell of the series from the inlet to the outlet cell it is apparent that since there is a temperature profile from the inlet to the outlet cell, the coffee substitute in the second cell is not subjected to the high temperature of the inlet cell and there is therefore less likelihood of the inulin and fructosans present in the chicory being hydrolysed to undesirable substances.

Preferably, the coffee substitute is thoroughly wetted before the extraction process and it has been found advantageous where a cell contains both coffee and coffee substitute, to put the coffee on the top. Where a cell contains two or more coffee substitutes, the substitutes are preferably added to the cell in layers from bottom to top. The extraction liquid preferably flows from the bottom to the top of each cell.

While the extraction liquid may be a dilute coffee extract it is preferably water.

The cycle time is generally approximately twice that of a standard process and may be from 30 to 75 minutes.

The extract drawn off may afterwards be processed by conventional methods, then either spray-dried or freeze-dried and finally agglomerated to give a soluble coffee powder.

The following Examples further illustrate the present invention. Parts are given by weight.

EXAMPLE 1

A coffee blend consisting of a mixture of Arabica and Robusta varieties was roasted for 16 minutes to an end temperature of 238° C. and ground. The coffee was extracted from a recipe of 66.3% of the above coffee blend and 33.7% roasted chicory.

The extraction system comprised five cells. 780 parts of coffee were placed in alternate cells including the inlet and outlet cell. 496 parts of chicory were placed in each of the remaining two cells, thoroughly wetted with water and 194 parts of coffee put on top.

Water entered the inlet cell at 187° at a pressure of 13 atmospheres, passed through the system where the temperature in successive cells was 182° C., 180° C. and 115° C. and was drawn off from the outlet cell where the temperature was 107° C. and the pressure was 1.7 atmospheres. The cycle time was 44 minutes and the amount of extract drawn off containing the soluble solids in a single batch was 10,920 parts.

During the draw-off the two cells with the most exhausted vegetable material were disconnected, discharged and reloaded and after the draw-off a pair of cells, one loaded with fresh coffee and the other loaded with fresh coffee and chicory respectively, was added to the system with the outlet cell being the cell containing solely coffee. The extraction was continued and the coffee extract was afterwards evaporated, spray-dried and agglomerated to give a soluble coffee powder. A coffee drink prepared from this powder was considered by a panel of tasters to have a pleasant strong coffee flavour.

EXAMPLES 2 to 6

By following a similar procedure to that described in Example 1, but using the conditions designated in the following Table 1, a soluble coffee powder was produced from a recipe containing 68% coffee and 32% chicory.

TABLE I

| Example | 2 | 3 | 4 | 5 | 6 |
|---|---|---|---|---|---|
| CELL: COFFEE (Parts) | 780 | 780 | 780 | 780 | 745 |
| CELL: COFFEE (Parts) | 284 | 284 | 284 | 284 | 200 |
| CHICORY (Parts) | 496 | 496 | 496 | 496 | 440 |
| TEMPERATURE PROFILE °C. | 187/182 | 186/182 | 183/— | 182/180 | 182/177 |
| | 178/113 | 179/111 | —/110 | 176/99 | 177/99 |
| | 105 | 105 | — | 99 | 94 |
| CYCLE TIME (Minutes) | 45 | 42 | 44 | 35 | 34 |
| DRAW-OFF (Parts) | 10,920 | 10,920 | 10,920 | 10,000 | 8,900 |

A panel of tasters considered that a coffee drink prepared from the soluble coffee powder had a pleasant strong coffee flavour.

EXAMPLES 7 and 8

A soluble coffee was produced from a recipe containing 50% of roasted coffee consisting of a mixture of Arabica and Robusta varieties and 50% roasted coffee substitute, by extracting with water from a system comprising five cells using the conditions designated in Table II below.

Coffee was placed in alternate cells including the inlet and the outlet cell and a mixture of coffee and coffee substitute were placed in layers in each of the two remaining cells with chicory on the bottom, then malt, then barley and a layer of coffee on top.

Water passed through the system and during the draw-off the two cells with the most exhausted vegetable material were disconnected, discharged and reloaded, and after the draw-off a pair of cells, one loaded with fresh coffee and the other loaded with fresh coffee and coffee substitutes, was added to the system with the outlet cell being the cell containing solely coffee. The extraction was continued and the coffee extract was afterwards evaporated, spray dried and agglomerated to give a soluble coffee powder.

TABLE II

| Examples | 7 | 8 |
|---|---|---|
| Cell-Coffee (Parts) | 60.0 | 65.0 |
| Cell-Coffee (Parts) | 5.0 | 5.0 |
| Barley (Parts) | 19.5 | 21.0 |
| Malt (Parts) | 27.3 | 29.0 |
| Chicory (Parts) | 18.2 | 20.0 |
| Feed-Water Temperature °C. | 160 | 170 |
| Cycle Time (Minutes) | 60 | 30 |

COMPARATIVE EXAMPLE

A soluble coffee was produced from a recipe containing 50% roasted coffee and 50% roasted coffee substitute by extracting with water from a system comprising five cells each cell containing the following vegetable materials arranged in layers from bottom to top.

Coffee: 26.0 parts
Barley: 10.0 parts
Malt: 13.5 parts

Chicory: 9.0 parts
Coffee: 6.5 parts

Water entered the system at 155° C. and the temperature fell to 95° C. in the outlet cell. During the draw-off the cell with the most exhausted vegetable materials was disconnected, discharged and reloaded and after the draw-off a cell loaded with fresh vegetable material was added to the system as the new outlet cell. The extraction was continued and the coffee extract was afterwards evaporated, spray-dried and agglomerated to give a soluble coffee powder.

A panel of tasters considered that a coffee drink prepared from the coffee powder of the Comparative Example was more harsh and not as balanced as a drink prepared from the coffee powders of Example 7 and 8 of the present invention.

We claim:

1. A process for forming a vegetable extract, in the absence of a stripping step prior to extraction, in a system comprising a series of cells containing coffee and coffee substitute, by contacting progressively fresher vegetable material countercurrently with an extraction liquid which enters an inlet cell so that the temperature of the inlet cell is in the range of from about 140° C. to 190° C. and is withdrawn in batches from an outlet cell such that the temperature of the outlet cell is in the range of from about 80° C. to 107° C. wherein during or after each draw-off the pair of cells containing the most exhausted vegetable material is disconnected from the system for discharge and reloading and after each draw-off a pair of cells with fresh loads of coffee and coffee substitute is added to the system so that the outlet cell is the second in series and contains the majority of coffee of the pair and wherein the pair of cells containing fresh loads of coffee and coffee substitute contains from about 40 to 80% by weight of coffee and the outlet cell and each succeeding alternate cell contains the majority of coffee of the pair with 70% to 95% by weight of the total coffee present in the pair of cells.

2. A process according to claim 1, wherein an odd number of cells are used in which both the inlet cell and the outlet cell contain more coffee than their respective adjacent cells.

3. A process according to claim 2 wherein five cells are used.

4. A process according to claim 1 wherein the vegetable material contains from 45 to 75% of coffee.

5. A process according to claim 1, wherein when the proportion of coffee in the vegetable material is from 45 to 60% the cell, of an adjacent pair of cells, which contains the majority of coffee contains from 80 to 95% of the total coffee of the pair.

6. A process according to claim 1, wherein when the proportion of coffee in the vegetable material is from 60 to 70%, the cell, of an adjacent pair of cells, which contains the majority of coffee contains from 70 to 80% of the total coffee of the pair.

7. A process according to claim 1, wherein when the proportion of coffee in the vegetable material is 40% or above the alternate cells containing the majority of coffee contain no or substantially no coffee substitute.

8. A process according to claim 1, wherein where a cell contains both coffee and coffee substitute the coffee is put on top.

* * * * *

UNITED STATES PATENT AND TRADEMARK OFFICE
CERTIFICATE OF CORRECTION

PATENT NO. : 4,374,864
DATED : February 22, 1983
INVENTOR(S) : Willi Hufnagel, Maurice Blanc and Walter Balimann It is certified that error appears in the above—identified patent and that said Letters Patent is hereby corrected as shown below:

Title Page, under the sub-heading "References Cited", "6646 1/1980 European Pat. Off....596/" should read --6646 1/1980 European Pat. Off.... 426/596--.

Column 6, Claim 8, line 1, delete "where".

Signed and Sealed this

Twenty-sixth Day of April 1983

[SEAL]

Attest:

GERALD J. MOSSINGHOFF

Attesting Officer     Commissioner of Patents and Trademarks